(12) United States Patent
Edwards

(10) Patent No.: US 6,390,368 B1
(45) Date of Patent: May 21, 2002

(54) CODING SYSTEMS

(75) Inventor: David Brian Edwards, Stevenage (GB)

(73) Assignee: Aquasol Ltd., Chemsford (GB)

( * ) Notice: Subject to any disclaimer, the term of this patent is extended or adjusted under 35 U.S.C. 154(b) by 0 days.

(21) Appl. No.: 09/445,332

(22) PCT Filed: Jun. 5, 1998

(86) PCT No.: PCT/GB98/01664

§ 371 Date: Mar. 13, 2000

§ 102(e) Date: Mar. 13, 2000

(87) PCT Pub. No.: WO98/55956

PCT Pub. Date: Dec. 10, 1998

(30) Foreign Application Priority Data

Jun. 7, 1997 (GB) .............................................. 9711702

(51) Int. Cl.$^7$ ................................................ G06K 7/10
(52) U.S. Cl. ................... 235/456; 235/462.09; 235/494
(58) Field of Search ............................... 235/494, 462.9

(56) References Cited

U.S. PATENT DOCUMENTS

| | | | |
|---|---|---|---|
| 3,558,899 A | | 1/1971 | Morgan et al. ............. 250/219 |
| 4,625,101 A | * | 11/1986 | Hinks et al. ................ 235/462 |
| 4,791,284 A | | 12/1988 | Ludden ...................... 235/487 |
| 5,268,566 A | * | 12/1993 | Wakaumi et al. ........... 235/493 |
| 5,473,152 A | * | 12/1995 | Apter et al. ................ 235/494 |
| 5,481,095 A | * | 1/1996 | Mitsuda et al. ............ 235/454 |
| 5,591,956 A | * | 1/1997 | Longacre, Jr. ............. 235/494 |
| 5,700,998 A | * | 12/1997 | Palti ............................ 235/375 |
| 5,742,041 A | * | 4/1998 | Liu .............................. 235/462 |
| 5,773,806 A | * | 6/1998 | Longacre, Jr. ............. 235/462 |
| 5,777,309 A | * | 7/1998 | Maltsev ...................... 235/462 |
| 5,788,111 A | * | 8/1998 | Waugh ........................ 220/458 |
| 6,088,482 A | * | 7/2000 | He et al. .................... 235/494 |
| 6,092,729 A | * | 7/2000 | Seo ............................. 235/462 |
| 6,220,333 B1 | * | 4/2001 | Cantwell ................... 164/4.1 |

FOREIGN PATENT DOCUMENTS

| | | | |
|---|---|---|---|
| EP | 0 689 152 | 12/1995 | ............ G06K/7/14 |
| GB | 2276476 | 9/1994 | .......... G06K/19/00 |
| GB | 2154775 | 9/1995 | .......... G06K/19/00 |
| WO | WO 89/00740 | 1/1989 | ............ G06K/1/12 |
| WO | WO 90/07162 | 6/1990 | .......... G06K/19/06 |

OTHER PUBLICATIONS

Patent Abstracts of Japan, vol. 013, No. 047 (P–822), Feb. 3, 1989 & JP 63 240688 A (Kajima Corp), Oct. 6, 1998, see abstract, Nov. 1, 2001.

* cited by examiner

Primary Examiner—Karl D. Frech
Assistant Examiner—Ahshik Kim
(74) Attorney, Agent, or Firm—Synnestvedt & Lechner LLP

(57) ABSTRACT

Machine readable coded markings carried on articles to identify various properties of the articles are disclosed. The coded markings are formed integrally of the article in the form of a sequence of areas having contrasting light scattering and reflecting properties incorporated on the article's surface. The areas are arranged in the form of neighboring blocks and empty spaces disposed around and outside of a central target area defined by a sequence of concentric continuous markings, the blocks forming a series of layers containing coded information. Each of the blocks is positioned side-by-side contiguous either with the outermost ring of the target or with a block in a previous layer.

16 Claims, 2 Drawing Sheets

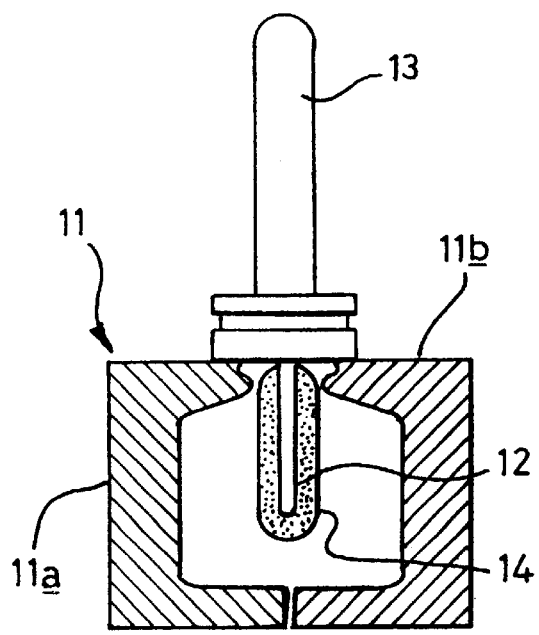
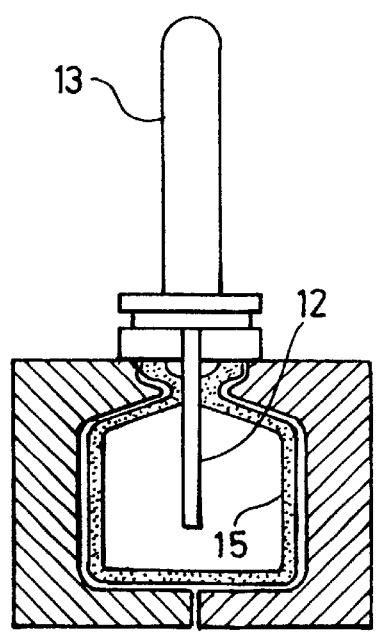
Fig. 1A　　　　　　Fig. 1B
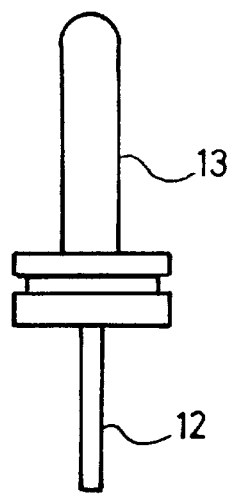
Fig. 1C
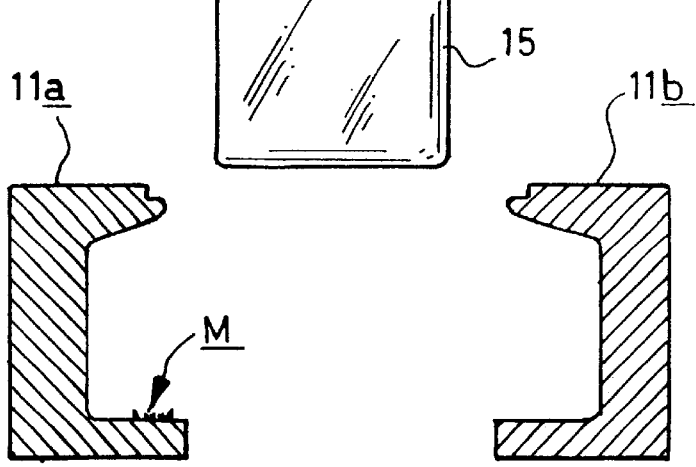

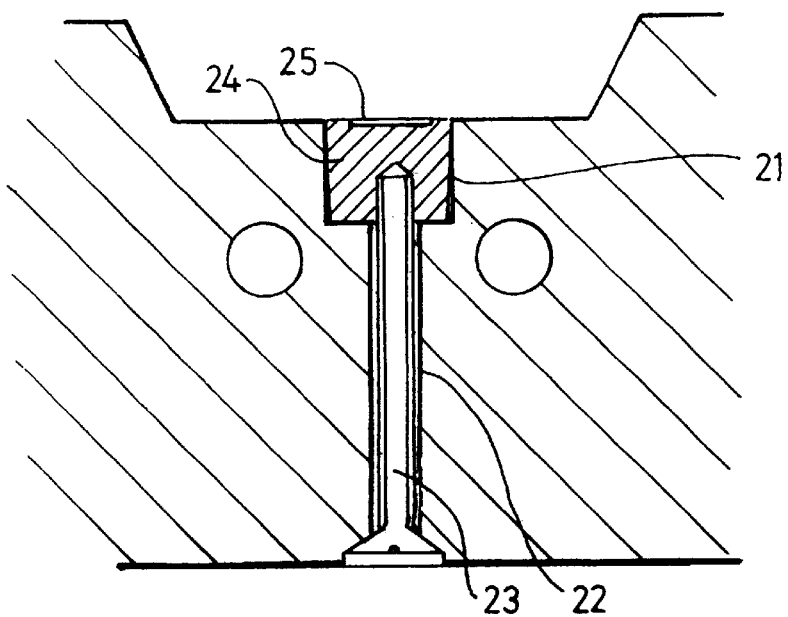
Fig. 2
Fig 3A
Fig. 3B
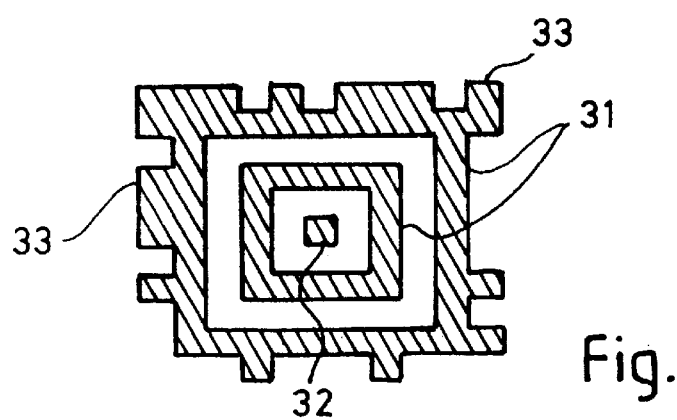
Fig. 4

CODING SYSTEMS

This invention relates to coding systems, and is concerned in particular with novel forms of coding useful for identifying articles, methods of applying identification codes to articles, and the purpose for which the codes so applied may be used.

It is now commonplace to recycle materials rather than merely throwing them away. Indeed, in a number of Countries it is, or it soon will be, a legal requirement that articles made of paper, plastic, glass and/or metal be retrieved and recycled, and that new articles made from such substances contain a minimum amount of "old" material recovered from objects that would otherwise be disposed of in dumps, landfill sites and the like. The recycling schemes utilised may require the householder, say, to separate rubbish into different waste containers—glass in one, plastic in another, and so on—but invariably further separation is required before the relevant material can efficiently be recycled. For example, not only is there a myriad different types of plastic commonly in use, most of which are most certainly not interchangeable as regards their properties (and thus their intended use), but even such a simple object as a plastic bottle comes in many different colours and with many different sorts of contents, and a subsequent User will not wish to have a batch of new bottles of one colour discoloured by some retrieved material of another, or risk a batch of new bottles for containing, say, a drink or foodstuff being contaminated by retrieved material from bottles that had previously held engine oil or weedkiller. It is therefore important, if a recycling scheme is to be a success, to separate into quite narrowly defined groups the various materials being retrieved; this, though, requires an accurate identification of the material, which in many cases is difficult if not actually impossible.

At present most separation of retrieved materials is done by hand—that is to say, the collected waste is carried on a conveyor past a number of sorting stations at each of which a human operator visually observes what is passing, and sorts it further on the basis of experience. This, though, is difficult, and in the limited time available it is easy to mistake one type of material for another—a polyethylene plastic for a polypropylene, or enamel-coated steel for resin-painted aluminium. As a result, much effort is being devoted to some sort of machine-based identification and separation arrangement, in which the significant properties—mass/density, conductivity, magnetism, light—scattering/reflectivity, for instance—of the materials forming the articles are tested and detected by appropriate specialised apparatus. Obviously some sort of gross separation can be achieved quite easily this way; articles of light materials like paper can be "blown" away from heavier objects made of metals, and magnetic materials such as steel can be attracted away from non-magnetic materials like aluminium. It becomes more difficult, though, when trying to sort things like plastics. It is possible to identify certain plastics quite easily—PolyVinyl Chloride, for example, can be detected by the spectral and other properties of the chlorine atoms—but in general, and with the extremely broad range of possible material types, there is as yet no satisfactory way of achieving the sort of extremely narrow group separation, down to colour and even previous contents, that is really desired.

The present invention relates to an alternative way of allowing the automatic, machine-based identification of certain sorts of materials—in particular the difficult materials such as plastics, and specifically the plastics (most commonly polyethylene, polypropylene, polystyrene, polyvinyl chloride and PolyEthylene Terephthalate, or PET) used in the manufacture of containers such as bottles. More specifically, the invention concerns the use of machine-readable coded markings carried by the containers to identify not only what they are made of but also what colour they are and what they were previously used for (what they contained).

It is well-known to provide an article—a bottle, say—with machine-readable coded markings that permit a determination of some fact of interest about the article (or, if it is a container, about its contents). Thus, practically every commercial product carries on its label (or on something like a price ticket attached to the product, or even as a special marking printed directly onto the product) a bar code that identifies the product (using one or other of the several internationally-agreed and approved coding systems), and practically every large shop or supermarket has a bar code reader of some description, either hand-held or stationary, that can be used to scan the code and then interface with a stock database computer that matches the code to its stock list and then outputs an indication of what that product is and what it costs. It would undoubtedly be possible to have a waste identification and retrieval system that made use of similar codes similarly applied. However, there are significant problems involved when using coded labels in a "waste" situation. For example, they will not necessarily be in a "standard" position on the article. Moreover, they will invariably either be dirty, damaged or actually missing, and so the reader (or the Operator, in the case of a hand-held system) may be unable to find them, or, if it can, may be either unable to read them at all or may confuse one code for another. Moreover, even if, say, the regulations were to require the use of a special label in a standard place, the sheer extra cost of making that label and then applying it could well be unacceptable. The invention suggests that these problems could be overcome—or, at least, mitigated—by the use of a coding system in which the product-defining codes are integral with the article itself, conveniently being formed therein during the manufacture of the article.

It is already known to employ integral coding systems with objects such as bottles, and specifically glass bottles, in order to identify the mould from which each bottle came (so that if faulty bottles are found in the output of a multiple-mould manufacturing plant it is easier to determine where the fault is likely to have originated). The codes usually take the form of raised or recessed areas moulded into the bottle on its base or on its heel (the curved area where the base joins the wall), and these require rather specialised equipment to read them. While these types of coding might be elaborated into a system that could be utilised to define the material from which a plastic bottle is made, none of them seems capable of providing reliable readability in a waste-retrieval situation. The invention therefore proposes a quite different way in which a coded marking could be formed integrally of the article—a container such as a bottle, say—itself, and that is one where the marking takes the form of a sequence (or similar arrangement) of areas having significantly contrasting light reflecting/scattering properties actually incorporated on/in the article's surface. The contrast may be achieved in one or more of several different ways—such as by the surface being relatively rough or smooth, or being relatively raised or lowered. Such a sequence can then be scanned and read, much in the way a bar code is scanned and read, by a scanner/reader device the output of which can be fed to a suitable database and there matched to provide an identification of at least the material from which the bottle is made, and possibly also the colour of that bottle and its previous contents.

In one aspect, therefore, the invention provides a method of enabling a moulded plastics article, and especially a container such as a bottle, to carry coded markings identifying some property of that article (or its contents), in which method there is formed integrally of the article, on or in the article's surface, a code-defining sequence (or similar arrangement) of areas having significantly contrasting light reflecting/scattering properties, the formation being effected by a moulding process carried out while the article itself is being moulded.

The invention enables an article to carry coded markings. Notionally, the article may be of any sort, for any purpose, and of any material. However, the invention's method has been developed especially for use in the identification and separation (for retrieval and re-use in some recycling arrangement) of containers, and particularly of plastic containers such as bottles (for all purposes), flasks, flagons, cans, canisters, jars, buckets and pails. For convenience, then, hereinafter for the most part the article is referred to simply as a container.

The article is provided with coded markings identifying some property of that article. These markings may involve any type of coding system, and may relate to any property somehow connected to the article. One typical coding system is that having the physical form of a bar code—a sequence of parallel lines, or bars, of different widths separated by blank areas (which may again be of different widths), the whole being scanned/read from one end to the other to provide a unique binary sequence (the bars and spaces correspond to 1s and 0s, or Ons and Offs, and depending on the protocol employed sets of these can represent numbers or letters). Examples of codes of this type are those known as European Article Numbering (EAN) 13, INTERLVD 2/5, CODE 128 and CODE 39.

Bar codes are essentially linear, or one-dimensional, and this limits the amount of information they can provide for a given area that they cover. A type of coding system which overcomes this limitation, and so can provide much more information, is one of the two-dimensional code types known in the Art. One such type of code is exemplified by those codes known as DATA MATRIX, MAXI CODE and AZTEC. In these the data is arranged not as parallel bars/spaces in a line but as neighbouring blocks/spaces disposed around a central target point in a series of circles or squares—layers of data, as it were. In use, the scanner/reader identifies the target point, and then scans in circles around it, layer by layer, to pick up the coded information. Two-dimensional codes of this sort are particularly preferred for use with the invention; indeed, the best code found so far is a modified form of AZTEC, as explained further hereinafter.

In the invention there is formed integrally of the article, on or in the article's surface, a code-defining sequence of areas having significantly contrasting light reflecting/scattering properties. The required contrast may be achieved in a number of different ways; those presently preferred include the surface being relatively rough or smooth, or being relatively raised or lowered (each such relatively-raised area is conveniently flat-topped, or planar, its surface being generally parallel with that of the article itself in that region). Indeed, a combination of these is particularly preferred, the surface first, as it were, being moulded into relatively-raised, flat-topped areas (from which light is scattered/reflected) and relatively-lowered areas (which scatter or reflect rather less light), and then the raised areas being made rougher, and so more light-scattering, than the lowered areas (which are left smoother).

As noted above, a preferred type of coding system is a modified AZTEC code, as is now explained. Present two-dimensional codes of the AZTEC type, as described in the Specification of Welch Allyn U.S. Pat. No. 5,591,956, have, as explained, a central target area defined by a sequence of two or three concentric continuous markings, or rings, usually square in shape, rather like the several "layers" of fortifications of a castle. Outside this target is the code proper—a multiplicity of "blobs" also arranged as a series of target-concentric markings, in a sequence of layers (sometimes as many as ten or more of such layers). For the most part the individual blobs tend to be on their own, as islands, unconnected either with other blobs or with the target save perhaps at a corner. Some blobs, however, are contiguous with other blobs, joined thereto along a side and so forming a larger island (but an island nevertheless), while a few other blobs are contiguous (joined side to side) with the outermost ring of the target, and so are rather like spits (projections of land connected to the mainland). Unfortunately, for the purposes of the present invention it is not easy with the presently-available equipment accurately to form on the surface of an article small islands of raised or rough material, nor is it easy to read a code including such islands. Accordingly, for use in the present invention there is proposed a modification of this type of coding system, in which modification each of the coding elements—the blobs that, together with the "empty" spaces therebetween, define the coded data—is side-by-side contiguous either with the outermost ring of the target, or with a blob that is so contiguous. More particularly, it is the raised or roughened coding elements—whether standing proud of or recessed into the article's surface—that are thusly contiguous. To take the fortified-castle analogy a step further, this makes the blobs (when standing proud) like buttresses against or guard towers projecting from the outermost wall of the castle. This simple modification—inventive in its own right—makes it very much easier both to form and thereafter to read the blob-defining raised/lowered and/or rough/smooth coded markings as preferably required for the invention.

The numbers of layers of blobs around the central target will naturally depend on the amount of information to be indicated. Generally, however, two, three or at the most four layers are sufficient for the purposes of the present invention.

The property of the article that is identified by the coded markings may be any property somehow connected with the article. However, the primary purpose of the method of the invention is to mark articles so as to identify—or allow the identification of—the material from which they are made. And as already noted hereinbefore, it is also highly desirable to code the article for its colour and for its previous use (where the article is a container such as a bottle, that is for its previous contents).

In the method of the invention there is formed integrally of the article, on or in the article's surface, a sequence (or similar arrangement) of areas having significantly contrasting light reflecting/scattering properties. The coding markings are formed integrally of the article, on or in the article's surface—that is to say, they are fabricated as part of the very structure of the article itself. This integral formation is quite different from the use of labels, which have to be attached in a separate stage of the article's manufacture, and which all too easily come off, get damaged, or are rendered ineffective by dirt; it can—though this is not essential—be effected without adding any stage to the manufacturing process (as is explained below), it is resilient to wear and tear, and so is highly unlikely to be damaged to the extent that it becomes unreadable, and the chances of it becoming permanently obscured by dirt and the like are remote.

The coding marks are on or in the article's surface—that is, they are either areas of the surface that are essentially co-planar with the rest of the article's surface area or they are areas which are either slightly above or below (or both) that surface area. In general, as is discussed further hereinafter, it is preferred that the coded markings be areas that are above and/or below the general surface of the article; this makes them much more resilient to damage, and also more easily readable by the presently-available scanning/reading apparatus. The amount by which the markings are so above/below seems not to be critical, though it will be appreciated that if it is small then it hardly provides the sought-after advantage, while if it is large it may become physically intrusive. For something like a PET bottle (where the material is only about 1–3 mm thick, depending on the location), markings that are 0.1 mm above/below seem quite satisfactory, although markings that are as much as 0.9 mm above/below have been utilised successfully.

It should be noted that the markings—for example, the areas of relative roughness separated by areas of relative smoothness—may define the desired coding in either a "positive" or a "negative" form. Thus, using a binary digital system for exemplification, the coding of the binary numbers "1" and "0" could be such that all the 1s are rough and all the 0s smooth, or it could equally be the opposite way round—all the is smooth and all the 0s rough. It seems to make no practical difference.

The markings can of course notionally be positioned anywhere on the (surface of the) article, and where is chosen may depend on what the article is, how it is made, and whether markings in one place are more easily readable or are perhaps less visually intrusive than in another. Conveniently, though, for a container they are sited near to or on the underside of the base, where they will not usually be seen but can nevertheless easily be located and read.

As noted, one preferred way of achieving the required contrast is to make the surface relatively rough or smooth. A rough surface can be formed in many different sorts of ways, and a sequence of rough and smooth areas can clearly be fabricated either by making rough—possibly by roughening—parts of a surface that would normally be smooth or by making smooth—possibly by smoothing—parts of a rough surface. However, the majority of plastic articles, and almost all containers (such as PET bottles), have smooth surfaces, so that the sought-after effect may conveniently be achieved by arranging for the appropriate portions of that surface to be made rough, instead.

In the invention the areas having significantly contrasting light reflecting/scattering properties are formed by a moulding process carried out while the article itself is being moulded. Thus, for example, there are moulded into the surface relatively rough or smooth areas and/or relatively raised or lowered areas. There are many techniques for doing either of these; preferably, though, there is preformed a die itself carrying the required markings, and then using this die to impress the markings into the surface of the article. Most preferably, indeed, the die is a suitably shaped and marked insert that fits within the mould used to make the article itself. This is now discussed further.

For articles, for instance containers such as PET bottles, that are made by a moulding process (typically an injection- or blow-moulding process)—it is convenient that there should first be formed a mould insert carrying the code (as rough and smooth portions, say, of as raised and lowered portions) on its surface, and that this insert should then be placed in the mould used to make the article so that, as that article is moulded, the coding markings on the insert's surface are faithfully replicated to the article's surface by the moulding process. The great advantage of this is that in part it uses already tried and tested technology. Many injection-moulding processes already employ mould inserts—small additional parts of the mould that can easily be placed at some defined position (such as that forming the base of the bottle) within the main mould so as to allow some extra, or batch-variable, shaping of the produced article (the Manufacturer's logo, say, or the batch number)—and clearly there will be no problem in arranging that the insert (also) carry the coding markings required by the present invention. It will be appreciated, of course, that the use of an insert to form the coding markings in the article is dependent on the material of the article being, in the mould, able to flow into the insert's markings so as to take the impression properly. Fortunately, the materials from which containers such as PET bottles are made (these bottles are usually a multi-layer laminate of PET itself together with various oxygen-barrier and adhesive layers, and the like) flow quite well, and the markings are satisfactorily copied.

Of course, if the mould insert method of producing the coding markings is to be employed it is necessary that the insert itself be of a material that can both be suitably marked/roughened and also repeatedly stand up to the conditions within the mould. Clearly, the insert could be of the same material as the mould itself—most moulds are made of a metal such as polished steel or aluminium, and so the insert also could be of that metal, suitably roughened and polished.

In the method of the invention there is formed on or in the article's surface a sequence of areas having significantly contrasting light reflecting/scattering properties, which areas constitute the coded markings. The contrast is, as will be understood, necessary to enable the scanner/reader device to tell the difference between the two sorts of areas, and thus correctly to read the code. Two ways of achieving the contrast are to make the areas relatively raised/lowered and to make the areas relatively rough/smooth. As regards the former, a raised area scatters or reflects more light than a lowered area simply because, being raised, there is nothing in the way to block the light, whereas with a lowered area not only can less light reach it in the first place, for it may be in the shadow of neighbouring raised areas, but less is likely to escape after reflection/scattering, again because of hindrance from the neighbouring raised areas. The deeper, relatively-speaking, the lowered areas the greater the contrast; however, obviously there are limits to how deep the lowered areas can be, this depending on such factors as the thickness and mouldability of the material from which the article is made, and the actual physical size of the coding. Simple experiment will permit a determination of the optimal depth in any particular case, but typical depths, and spacings, are around 0.1 to 1 mm.

As regards using rough/smooth areas, the degree of roughness necessary to achieve the desired contrast in light reflecting/scattering properties may vary from material to material, and should therefore be carefully matched thereto (again, this can usually be effected by simple experiment). In broad terms, though, the situation is as follows. A smooth surface has high specular reflection, so that viewed from one angle it may seem very bright, as it reflects, mirror-like, whatever light is shone on it, whereas viewed from another angle it seems quite dark (it is reflecting the light elsewhere). A roughened surface, however, provides diffuse, aspecular reflection of the ambient light, and within limits this will be more or less constant no matter from which angle the surface is viewed. In another variant, where a transparent material becomes translucent when it is roughened, so light from a source behind it can be used successfully to illuminate the coding markings.

Very rough surfaces tend towards being multi-specular; surfaces which have only the smallest degree of roughness also tend to be specular. In general, surfaces with roughnesses of the order of 21–42 VDI, and especially in the more limited range of 30–33 VDI (respectively 1.12–12.5 and 3.5–4.5 RA) seem to provide a satisfactory contrast under most normal lighting conditions. With either rougher or smoother surfaces—particularly when they are very small—there is likely to be insufficient contrast or uniformity to enable an easy and accurate reading of the markings.

Although the use of the coding system of the invention gives excellent results under all reasonable conditions, there may be occasions—particularly where the ambient light levels are low—when it is less than completely satisfactory. To deal with such moments, then, it may be desirable to take advantage of one or both of two techniques commonly used to make surface markings on an article stand out; providing a "quiet space" around the markings, and "tampo" printing.

A quiet space is an area of the surface, around the markings, which is quite plain (empty of any marks), so that the markings are clearly seen as an item in a sea of empty space. Usually the quiet space is itself defined by a boundary line, so that the combination becomes a bounded empty space with the markings isolated in the middle of it. Such an arrangement is very easily spotted and interpreted by the various scanners/code readers presently in use.

Tampo printing is the printing onto the raised areas of relief markings on a surface of an ink in a colour that contrasts sharply with the colour of the rest of the marked area (this is rather like what is done when using a conventional printing plate into which has been etched a picture; when an inked roller is run over the surface it transfers ink only to the upper areas, not to the lower, etched-away areas, so that when a paper sheet is then pressed against the plate the ink it picks up comes only from the upper parts). In the present invention this technique may be used to increase the contrast between the raised areas and the lowered areas, or between the roughened areas and the smooth areas; one set—it seems not to matter which—will stand proud relative to the other, so the ink will print onto that set only, so enhancing the contrast with the other set.

The invention provides a method of enabling an article, and especially a container such as a bottle, to carry coded markings identifying some property of that article (or, if appropriate, its contents). In this method there is formed integrally of the article a sequence (or similar arrangement) of areas having significantly contrasting light reflecting/scattering properties, and this sequence can be scanned and read, much in the way a bar code is scanned and read, by a scanner/reader device the output of which can be fed to a suitable database and there matched to provide whatever identification it represents of the material from which the bottle is made, and possibly also the colour of that bottle and its previous contents.

The invention extends, of course, to a moulded plastics article, and especially a container such as a bottle, whenever bearing coded markings fabricated by a moulding process integrally of the article, on or in the article's surface, and taking the form of a sequence (or similar arrangement) of areas having significantly contrasting light reflecting/scattering properties—and particularly where the contrast is achieved by the surface being relatively rough or smooth, or being relatively raised or lowered.

Moreover, the invention also extends to a recycling method in which separation of articles into groups is effected upon the basis of the articles being as just defined—each having coded markings identifying some property of that article (or, if appropriate, its contents) formed integrally of the article, on or in the article's surface, as a sequence (or similar arrangement) of areas having significantly contrasting light reflecting/scattering properties.

Furthermore, the invention additionally extends to the modified Aztec coding arrangement described herein, and thus to a coding arrangement, for identifying—in a visible manner readable by appropriate mechanical and/or electronic scanning equipment—some property of the article to which the coding is applied, in which arrangement the information to be imparted is in the form of neighbouring blocks and spaces disposed around a central target point in a layered series of circles or squares, such that in use, the code-reading scanning equipment identifies the target area, and then scans in circles around it, layer by layer, to pick up the coded information, which arrangement incorporates the improvement that each of the coding elements—the blocks that, together with the "empty" spaces therebetween, define the coded data—is side-by-side contiguous either with the outermost ring of the target, or with a block that is so contiguous.

The expression "side-by-side contiguous" is here used to indicate that a block is to be joined along its entire side to the outer ring, or to a neighbouring block, and thus to exclude the case where a block is "joined" only at a corner to some other part of the whole.

The invention also extends to a coding system (of code-illuminating and -scanning apparatus) making use of such a coding arrangement.

Various aspects of the invention are now described, though by way of illustration only, with reference to the accompanying Drawings in which:

FIG. 1 shows three stages in the formation of a plastic bottle by a blow-moulding process;

FIG. 2 shows the use of a mould insert according to the invention;

FIG. 3 shows two examples of AZTEC coding; and

FIG. 4 shows the modified AZTEC coding arrangement favoured by the invention.

In FIG. 1 there is seen three stages in the blow-moulding of a plastic bottle. In FIG. 1A there is shown the mould (generally 11, and in two halves 11a and 11b), with inserted into it (from the top) a feed tube (12) through which compressed gas may be fed (from gas source 13) into the mould. The tube 12 is "surrounded" by a layer (14) of the plastic that is going to be blown into the desired bottle. The plastic 14 is hot (and may be kept hot, by means not shown), so that it flows easily. The mould, however, is kept relatively cold (again by means not shown), so that when the hot plastic is blown into contact therewith it too becomes cold, and so sets in the required shape.

When everything is ready, compressed gas is fed from the source 13 to the tube 12, and blows up the layer 14 of plastic just like blowing up a balloon. The result is shown in FIG. 1B, with the plastic 15 now taking that shape of the required bottle.

Once the plastic 15 has cooled sufficiently the two halves of the mould are separated, and the bottle is withdrawn.

In the method of the invention there is used a mould insert that carries the required coding markings, and is so positioned within the mould as to impress those markings onto/into the plastic as it is blown into the bottle shape. The insert is shown in place in more detail in FIG. 2 (its position is shown in FIG. 1C by the "M". The mould is made with a small recessed area (21) in its base, this area having a channel (22) for an insert-retaining-screw (23) communicating with the outside of the mould. The insert (24) is positioned suitably orientated (with the coded markings 25 facing into the mould) in the recess 21, and retained therein with the screw 23.

As will easily be understood, when the soft, flowable plastic 14 expands into contact with the mould walls, and thus with the insert 24 in the base of the mould, it will also expand and flow into the markings 25, so being impressed with them, as is required.

FIGS. 3A and 2B show the markings for, respectively, a simple and a much more complicated AZTEC-type code. Each has a central target area defined by square rings (as 31; two for FIG. 3A, three for FIG. 3B) with a dot (32) in the middle, and this target area is surrounded by rings of coded markings (as 33; three rings in 3A, 14 in 3B).

FIG. 4 shows the modified, "chunkier" form of this coding system that is most preferably employed in the method of the invention.

What is claimed is:

1. A coding arrangement, for identifying—in a visible manner readable by appropriate mechanical and/or electronic scanning equipment—some property of the article to which the coding is applied, in which arrangement the information to be imparted is in the form of neighbouring blocks and spaces disposed around and outside a central target area defined by a sequence of concentric continuous markings, or rings, the blocks forming a series of layers, such that in use the code-reading scanning equipment identifies the target area, and then scans around it, layer by layer, to pick up the coded information, which arrangement incorporates the improvement that each of the blocks is side-by-side contiguous either with the outermost ring of the target or with a block in a previous layer.

2. A coding arrangement as claimed in claim 1, wherein there are two, three or four layers of coding element blocks around the central target.

3. A method of enabling a moulded plastics article to carry coded markings identifying some property of that article (or its contents), in which method there is formed integrally of the article, on or in the article's surface, a code-defining sequence of areas having significantly contrasting light reflecting and scattering properties, the formation being effected by a moulding process carried out while the article itself is being moulded, said areas being in the form of neighboring blocks and spaces disposed around and outside a central target area defined by a sequence of concentric continuous markings, or rings, the blocks forming a series of layers, such that in use the code-reading scanning equipment identifies the target area, and then scans around it, layer by layer, to pick up the coded information, which arrangement incorporates the improvement that each of the blocks is side-by-side contiguous either with the outermost ring of the target or with a block in a previous layer.

4. A method as claimed in claim 3, in which the article is a plastic container.

5. A moulded plastics article whenever bearing coded markings fabricated by a moulding process integrally of the article, on or in the article's surface, and taking the form of a sequence (or similar arrangement) of areas having significantly contrasting light reflecting and scattering properties, the areas being arranged according to claim 3.

6. A coding system comprising code-illuminating apparatus, code-scanning apparatus, and a coding arrangement as defined in claim 1.

7. A method as claimed in claim 3 in which the coding system utilized employs a two-dimensional code.

8. A method as claimed in claim 7, in which the code employed is a modified form of AZTEC code in which arrangement of the information to be imparted is in the form of neighboring blocks and spaces disposed around and outside a central target area defined by a sequence of concentric continuous markings, or rings, the blocks forming a series of layers, such that in use the code-reading scanning equipment identifies the target area, and then scans around it, layer by layer, to pick up the coded information, which arrangement incorporates the improvement that each of the blocks is side-by-side contiguous either with the outermost ring of the target or with a block in a previous layer.

9. A method as claimed in claim 3, in which the coded markings are in the article's surface—that is, they are areas which are either slightly above or below (or both) that surface area.

10. A method as claimed in any of claim 3, in which the markings are sited near to or on the underside of the base of the article.

11. A method as claimed in claim 3, in which the markings are formed on/in the surface of the article by employing a suitably shaped and marked mould insert.

12. A method as claimed in claim 3, in which the required contrast is achieved by making the areas relatively raised or lowered, relatively rough or smooth, or both relatively raised and rough or lowered and smooth.

13. A method as claimed in claim 12, in which the rough portions of the markings have a roughness of from 21–42 Verein Deutscher Ingenieure.

14. A method as claimed in claim 13, in which the roughness is from 30–33 Verein Deutscher Ingenieure.

15. A method as claimed in claim 3, in which there is provided a quiet space around the markings.

16. A method as claimed in claim 1, in which the area of coding markings is tampo printed.

* * * * *